(12) United States Patent
Sudo

(10) Patent No.: US 12,022,241 B2
(45) Date of Patent: Jun. 25, 2024

(54) IMAGE PROJECTION METHOD AND PROJECTOR

(71) Applicant: SEIKO EPSON CORPORATION, Tokyo (JP)

(72) Inventor: Chihiro Sudo, Tokyo-To (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/969,735

(22) Filed: Oct. 20, 2022

(65) Prior Publication Data

US 2023/0124225 A1 Apr. 20, 2023

(30) Foreign Application Priority Data

Oct. 20, 2021 (JP) .................................. 2021-171527

(51) Int. Cl.
*H04N 9/31* (2006.01)
*G06T 5/80* (2024.01)

(52) U.S. Cl.
CPC ............. *H04N 9/3185* (2013.01); *G06T 5/80* (2024.01)

(58) Field of Classification Search
CPC ........... G06T 3/00; G06T 3/0031–0093; G06T 5/006; G06T 2207/30204; G06T 2207/30208; G06T 5/80; H04N 9/3185
See application file for complete search history.

(56) References Cited

U.S. PATENT DOCUMENTS

| | | | | |
|---|---|---|---|---|
| 6,450,647 B1 * | 9/2002 | Takeuchi | ............. | H04N 9/3185 353/69 |
| 6,646,760 B1 * | 11/2003 | Hanihara | ................. | H04N 1/58 358/1.9 |
| 2007/0008344 A1 * | 1/2007 | Medina | ................ | H04N 9/3185 345/647 |
| 2012/0120372 A1 | 5/2012 | Timoner et al. | | |
| 2013/0083058 A1 | 4/2013 | Yoshimura | | |
| 2015/0189267 A1 * | 7/2015 | Kaji | ..................... | H04N 9/3182 348/187 |
| 2016/0275659 A1 * | 9/2016 | Nimura | ................ | G06T 3/0093 |

FOREIGN PATENT DOCUMENTS

| | | | |
|---|---|---|---|
| JP | 2005012407 A | * | 1/2005 |
| JP | 2006005549 A | * | 1/2006 |
| JP | 2009-021771 A | | 1/2009 |
| JP | 2014-503838 A | | 5/2012 |
| JP | 2013-078001 A | | 4/2013 |
| JP | 2014-225182 A | | 12/2014 |
| JP | 2017-032873 A | | 2/2017 |
| JP | 2019-106589 A | | 6/2019 |
| JP | 2021-064848 A | | 4/2021 |

* cited by examiner

*Primary Examiner* — John W Miller
*Assistant Examiner* — Humam M Satti
(74) *Attorney, Agent, or Firm* — Dority & Manning, P.A.

(57) ABSTRACT

An image projection method includes projecting an image including a plurality of adjustment points on a screen, determining positions of the plurality of adjustment points on the screen, determining whether each of a plurality of sides connecting the adjustment points adjacent to each other is a linear line or a curved line, obtaining geometrically-corrected image by performing geometric correction on the image in a range corresponding to an area defined by the plurality of sides including the linear line and the curved line based on the plurality of sides defining the area, and projecting the geometrically-corrected image on the screen.

6 Claims, 10 Drawing Sheets

IMAGE PROJECTION METHOD AND PROJECTOR

The present application is based on, and claims priority from JP Application Serial Number 2021-171527, filed Oct. 20, 2021, the disclosure of which is hereby incorporated by reference herein in its entirety.

BACKGROUND

1. Technical Field

The present disclosure relates to an image projection method and a projector.

2. Related Art

JP-A-2021-64848 discloses a technique of geometric correction processing of a projection image to be projected on a screen in an arbitrary shape by cubic spline interpolation using movement positions or grid points projected on a curved screen.

However, in the technology disclosed in JP-A-2021-64848, it is impossible to individually designate attributes of the respective lines connecting the grid points, and complex geometric correction may be difficult.

SUMMARY

An aspect is directed to an image projection method including projecting a plurality of adjustment points relatively defined to an image on a screen, determining positions of the plurality of adjustment points on the screen, determining whether each of a plurality of sides connecting the adjustment points adjacent to each other is a linear line or a curved line, performing geometric correction on the image in a range corresponding to an area defined by the plurality of sides including the linear line and the curved line to realize the plurality of sides defining the area, and projecting the geometrically-corrected image on the screen.

Another aspect is directed to a projector including a projection device projecting a plurality of adjustment points relatively defined to an image on a screen and projecting the image on the screen, an input interface determining positions of the plurality of adjustment points on the screen, a processing circuit determining whether each of a plurality of sides connecting the adjustment points adjacent to each other is a linear line or a curved line, and a correction circuit performing geometric correction on the image in a range corresponding to an area defined by the plurality of sides including the linear line and the curved line to realize the plurality of sides defining the area.

DESCRIPTION OF EXEMPLARY EMBODIMENTS

Figure 1:
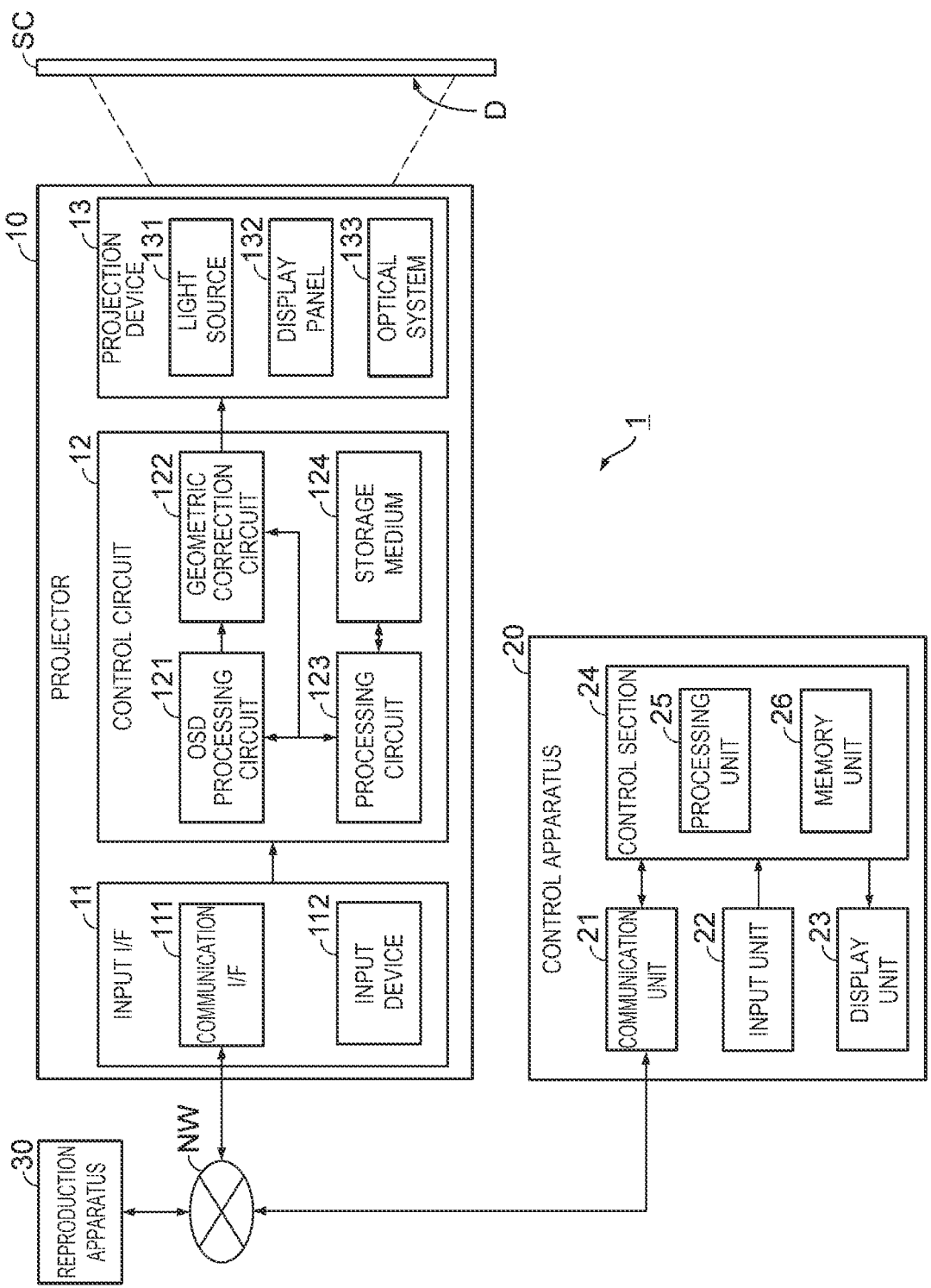
FIG. 1 is a schematic block diagram for explanation of a projection system according to an embodiment.

As below, an embodiment of the present disclosure will be explained with reference to the drawings. The embodiment exemplifies a system for implementation of the technical idea of the present disclosure and an apparatus and a method used for the system. The technical idea of the present disclosure does not limit types and configurations of the respective apparatuses, network topology, a series of processing, etc. to those described as below. In the drawings, the same or similar elements may respectively have the same or similar signs and the overlapping explanation may be omitted.

As shown in FIG. 1, a projection system 1 according to the embodiment includes e.g. a projector 10 projecting an image D on a screen SC and a control apparatus 20 communicating with the projector 10 via a network NW. The projection surface of the screen SC may have a flat surface or a curved surface. Or, the projection surface may be a combination of a plurality of flat surfaces and a plurality of curved surfaces or discontinuous.

The projector 10 includes an input interface (I/F) 11, a control circuit 12, and a projection device 13. The input I/F 11 includes e.g. a communication I/F 111 and an input device 112. The input I/F 11 detects various kinds of input by a user and outputs signals according to the input by the user to the control circuit 12.

The communication I/F 111 establishes a communication link via the network NW with the control apparatus 20 according to the control by the control circuit 12, and thereby, communicably couples to the control apparatus 20. The communication I/F 111 includes a communication circuit processing a signal transmitted in the communication link. The communication link may be wired, wireless, or a combination of wired and wireless connection. That is, the communication I/F 111 may be coupled to the control apparatus 20 directly or indirectly via another relay device. The communication I/F 111 may include e.g. an antenna transmitting and receiving radio signals and a receptacle into which a plug of a communication cable is inserted.

For example, the communication I/F 111 sequentially acquires image data transmitted from the control apparatus 20 and outputs the data to the control circuit 12. The communication I/F 111 may acquire image data reproduced in a reproduction apparatus 30. For the purpose, the projection system 1 may include the reproduction apparatus 30. As the reproduction apparatus 30, an arbitrary apparatus having a function of supplying image data to the projector 10 e.g. a personal computer, a tablet terminal, a smartphone, a digital media player, a camera, a movie player, a wireless display adapter, a television tuner, a video game machine, or the like can be employed.

The input device 112 detects input by the user and outputs a signal according to the input by the user to the control circuit 12. For example, as the input device 112, various input devices including various switches such as a push button and a touch sensor, a pointing device such as a mouse and a touch panel, and a keyboard can be employed. To detect voice of the user as input using a voice recognition technology, a microphone may be employed as the input device 112. Or, as the input device 112, a gesture sensor detecting gesture or the user as input may be employed. The input device 112 may be a pointing device detecting a position of a pointer on the screen SC. The input device 112 may include a wired or wireless remote controller. The input I/F 11 may detect input by the user to an input unit 22 of the control apparatus 20 via the communication I/F 111.

The projection device 13 includes a light source 131, a display panel 132, and an optical system 133. The light source 131 includes e.g. a light emitting device such as a discharge lamp or a solid-state light source. The display panel 132 is a light modulation device having a plurality of pixels. The display panel 132 modulates light emitted from the light source 131 according to an image signal output from the control circuit 12. The display panel 132 is e.g. a transmissive or reflective liquid crystal light valve. The display panel 132 may be a digital micromirror device controlling reflection of light with respect to each pixel. Obviously, the display panel 132 in the single projection device 13 may include a plurality of display panels modulating lights having different wavelengths from one another. The optical system 133 projects an image D on the screen SC by radiating the light modulated by the display panel 132 onto the screen SC. The optical system 133 may include various kinds of lenses, mirrors, and drive mechanisms.

The control circuit 12 includes an OSD processing circuit 121, a geometric correction circuit 122, a processing circuit 123, and a storage medium 124. The control circuit 12 controls the projection device 13 to project the image D based on the image data input from the communication I/F 111 on the screen SC. The control circuit 12 performs geometric correction on the image D projected on the screen SC based on the input by the user detected by the input unit 22 or the input device 112.

The OSD processing circuit 121 generates a plurality of adjustment points to be projected on the screen SC using e.g. an on-screen display (OSD) technique for geometric correction on the image D. The OSD processing circuit 121 projects the plurality of adjustment points via the projection device 13. The respective positions of the plurality of adjustment points on the screen SC are adjusted according to the input by the user to the input unit 22 or the input device 112. That is, the input I/F 11 detects the input for adjustment of the positions of the plurality of adjustment points.

The geometric correction circuit 122 executes the geometric correction of the image by controlling the display panel 132 based on the positions of the plurality of adjustment points. Specifically, the geometric correction circuit 122 executes the geometric correction based on a transformation factor calculated by the processing circuit 123. As a series of processing for the geometric correction by the geometric correction circuit 122 and the processing circuit 123, various kinds of two-dimensional coordinate transformation including affine transformation and homography transformation, and various kinds of interpolation including bilinear interpolation and bicubic interpolation may be appropriately executed.

The processing circuit 123 forms a processing device of a computer processing calculations necessary for the operation of the projector 10. For example, the processing circuit 123 executes a control program stored in the storage medium 124 and realizes various functions described in the embodiment. At least part of the OSD processing circuit 121 and the geometric correction circuit 122 may be realized by the processing circuit 123. As a processing device forming at least a part of the processing circuit 123, various arithmetic logic circuits including e.g. a central processing unit (CPU), a digital signal processor (DSP), a programmable logic device (PLD), and application specific integrated circuits (ASIC) can be employed. The processing circuit 123 may be formed using integrated hardware or individual pieces of hardware.

The storage medium 124 is a computer-readable storage device storing a control program representing a series of processing necessary for the operation of the processing circuit 123 and various kinds of data. As the storage medium 124, e.g. a semiconductor memory or various disk media can be employed. The storage medium 124 is not limited to a non-volatile auxiliary storage device, but may include a volatile main storage device such as a register or a cash memory. At least a part of the storage medium 124 may be formed using a part of the processing circuit 123. The storage medium 124 may be formed using integrated hardware or individual pieces of hardware.

The control apparatus 20 includes e.g. a communication unit 21, the input unit 22, a display unit 23, and a control section 24. The communication unit 21 includes a communication circuit that establishes a communication link with the projector 10 and processes a signal transmitted in the communication link. The communication unit 21 establishes the communication link via a network NW with the projector 10 according to the control by the control section 24, and thereby, communicably couples to the projector 10. The communication unit 21 may include e.g. an antenna transmitting and receiving radio signals and a receptacle into which a plug of a communication cable is inserted.

The input unit 22 is an input device detecting input by the user and outputting a signal according to the input by the user to the control section 24. At least one of various input devices employable as the input device 112 can be employed as the input unit 22.

The display unit 23 is a display displaying an image on a screen according to the control by the control section 24. The display unit 23 is e.g. a flat panel display. The control section 24 may transmit image data representing an image to the projector 10 via the communication unit 21, and thereby, the image D projected by the projector 10 may be used as the image of the display unit 23. The input unit 22 and the display unit 23 may form a touch-panel display.

The control section 24 includes a processing unit. 25 and a memory unit 26. The processing unit 25 forms a processing device of a computer processing calculations necessary for the operation of the control apparatus 20. For example, the processing unit 25 executes a program stored in the memory unit 26 and realizes various functions of the control apparatus 20 described in the embodiment. As a processing device forming at least a part of the processing unit 25, various arithmetic logic circuits including e.g. a CPU, a DSP, a PLD, and an ASIC can be employed. The processing unit 25 may be formed using integrated hardware or individual pieces of hardware.

The memory unit 26 is a computer-readable storage device storing a program representing a series of processing necessary for the operation of the control apparatus 20 and various kinds of data. As the memory unit 26, e.g. a semiconductor memory or various disk media can be employed. The memory unit 26 is not limited to non-volatile auxiliary storage device, but may include a volatile main storage device such as a register or a cash memory. At least a part of the memory unit 26 may be formed using a part of the processing unit 25. The memory unit 26 may be formed using integrated hardware or individual pieces of hardware.

As below, referring to a flowchart in FIG. 2, as an image projection method by the projection system 1, an example of a series of processing executed in the projection system 1 will be explained. For example, the control circuit 12 prompts the user to adjust the installation condition of the projector 10 by projecting an image corresponding to the maximum projection range via the projection device 13. Thereby, the installation condition of the projector 10 may be adjusted in advance so that the image D may be projected in an arbitrary range on the screen SC.

At step S101, the projection device 13 projects a plurality of adjustment points relatively defined to the image D as an adjustment point pattern on the screen SC. The plurality of adjustment points are projected on the screen SC as a plurality of grid points in a two-dimensional grid pattern. For example, the processing circuit 123 determines an adjustment point pattern in the initial state based on basic information on image projection stored in the storage medium 124. The OSD processing circuit 121 generates the adjustment point pattern determined by the processing circuit 123 and projects the pattern on the screen SC via the projection device 13.

Figure 3:
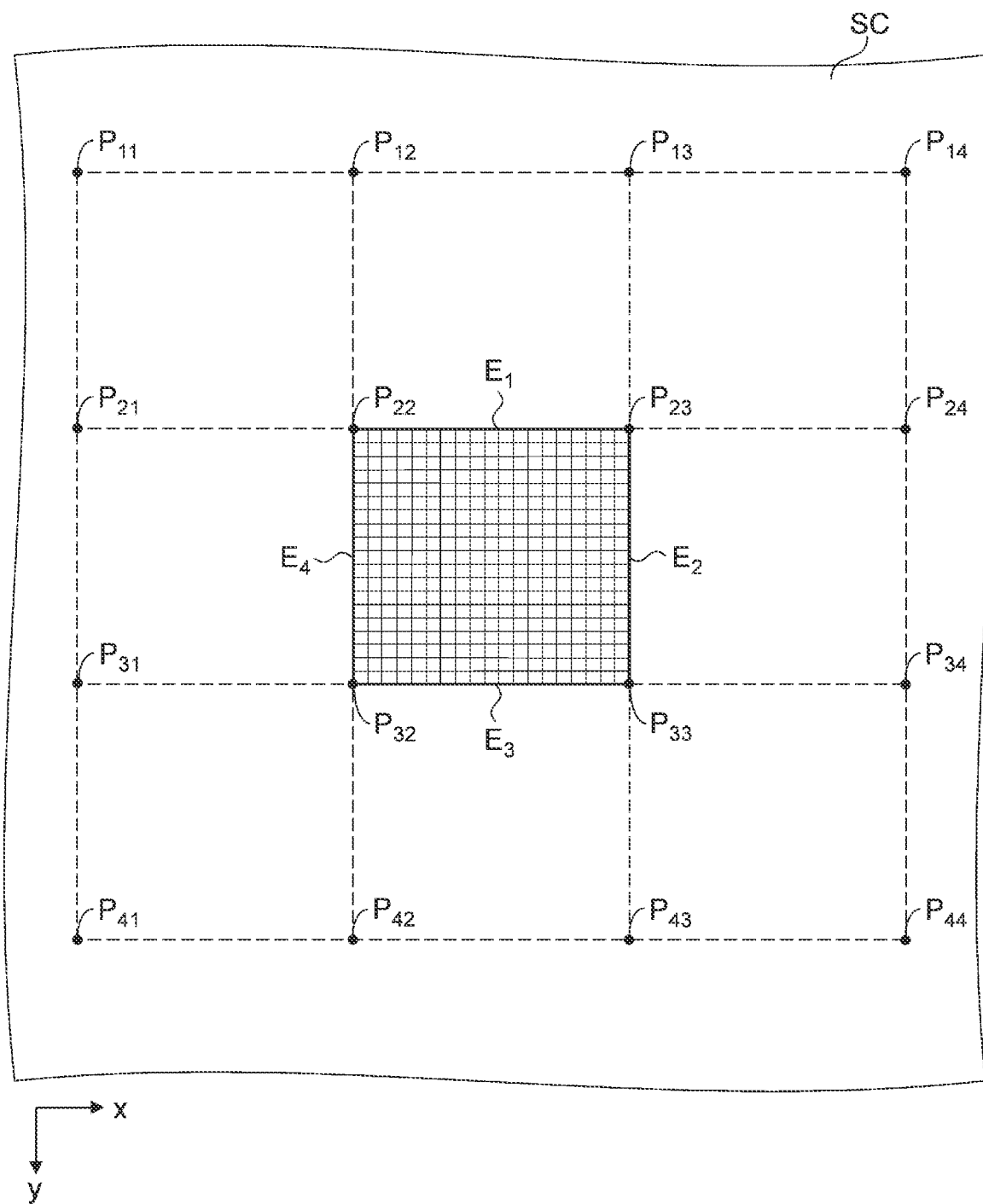
FIG. 3 is a diagram for explanation of an initial state of an adjustment point pattern.

For example, as shown in FIG. 3, the projection device 13 projects 16 adjustment points $P_{11}$ to $P_{14}$, $P_{21}$ to $P_{24}$, $P_{31}$ to $P_{34}$, $P_{41}$ to $P_{44}$ arranged in a matrix form of 4×4 on the screen SC as the adjustment point pattern in the initial state. The plurality of adjustment points may be arranged in a matrix form of n×m, not limited to 4×4. n and m are respectively integers equal to or larger than 2. The number of adjustment points may be set to an arbitrary value by editing of the basic information in the storage medium 124 according to the input by the user to the input I/F 11.

In the example of FIG. 3, the four adjustment points $P_{11}$, $P_{14}$, $P_{44}$, $P_{41}$ form four vertices of the rectangular image D. With the plurality of adjustment points $P_{11}$ to $P_{44}$ as grid points, only in an area surrounded by sides $E_1$ to $E_4$ of a plurality of unit areas defined by respective grid lines shown by dashed lines, a coordinate system of pixels in an area corresponding to the image D is shown as a fine grid pattern. The side $E_1$ is a line connecting between the adjustment point $P_{22}$ and the adjustment point $P_{23}$ adjacent to each other. The side $E_2$ is a line connecting between the adjustment point $P_{23}$ and the adjustment point $P_{33}$ adjacent to each other. The side $E_3$ is a line connecting between the adjustment point $P_{33}$ and the adjustment point $P_{32}$ adjacent to each other. The side $E_4$ is a line connecting between the adjustment point $P_{32}$ and the adjustment point $P_{22}$ adjacent to each other. Here, "adjacent" means adjacent on the grid line shown by the dashed line, that is, adjacent in the x-axis directions or the y-axis directions in the adjustment point pattern in the initial state shown in FIG. 3.

At step S102, the input I/F 11 determines the positions of the plurality of adjustment points $P_{11}$ to $P_{44}$ on the screen SC by detecting input for adjustment of the positions of the plurality of adjustment points $P_{11}$ to $P_{44}$. For example, the processing unit 25 prompts the user to adjust the positions of the adjustment points $P_{11}$ to $P_{44}$ by displaying a message, for request to arrange the positions of the adjustment points $P_{11}$ to $P_{44}$ to fit the shape of the projection surface, on the display unit 23. For example, the OSD processing circuit 121 adjusts the positions of the plurality of adjustment points $P_{11}$ to $P_{44}$ by the input I/F 11 detecting input by the user to the input unit 22. Accordingly, the display unit 23 may display an input window having a plurality of points corresponding to the plurality of adjustment points $P_{11}$ to $P_{44}$. The input I/F 11 detects input of completion of the adjustment of the positions of the plurality of adjustment points $P_{11}$ to $P_{44}$, and thereby, the processing circuit 123 judges that the positions of the plurality of adjustment points $P_{11}$ to $P_{44}$, are determined and proceeds with the processing to step S103.

Figure 4:
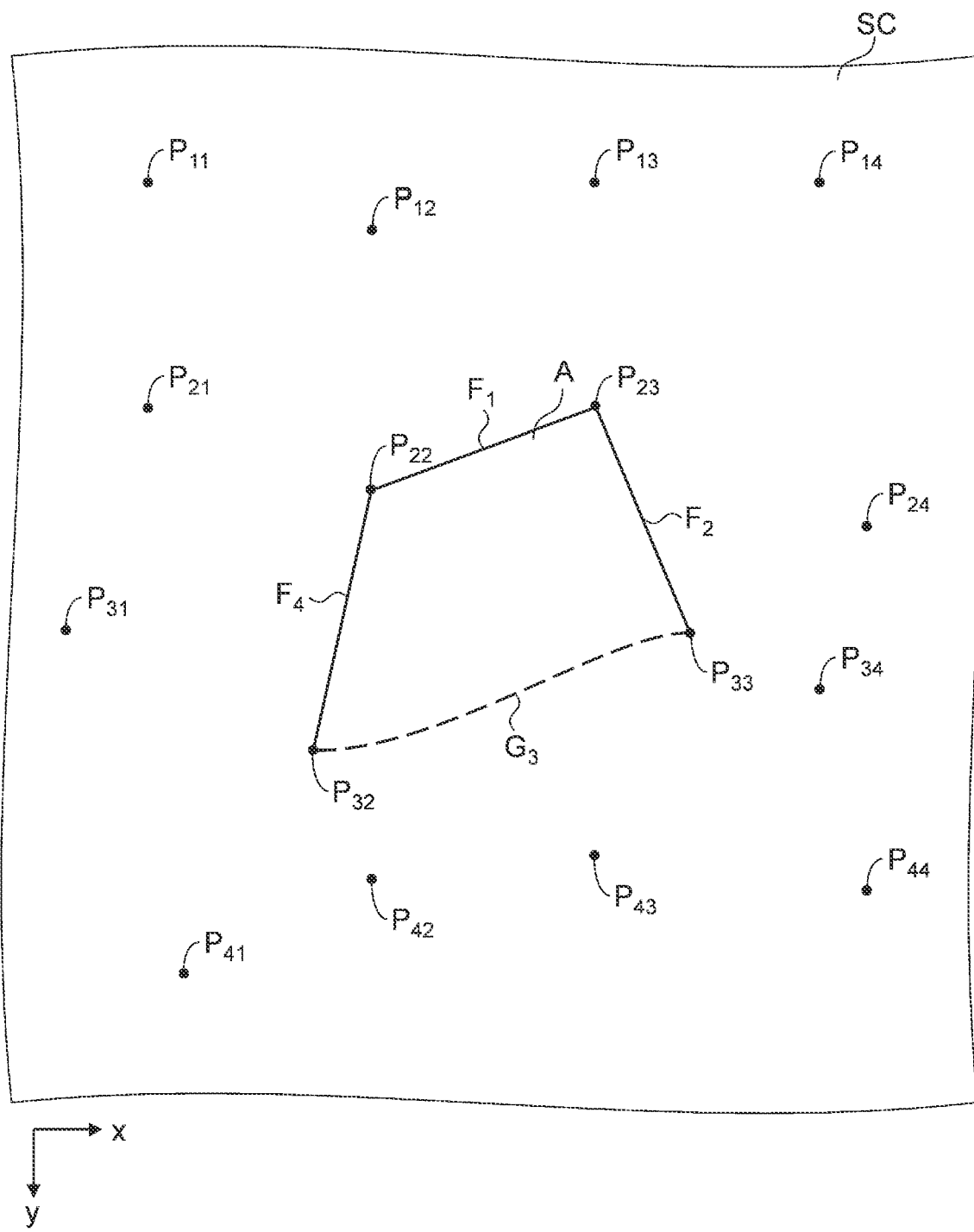
FIG. 4 is a diagram for explanation of processing of determining positions of adjustment points and sides.

As shown in FIG. 4, the positions of the plurality of adjustment points $P_{11}$ to $P_{44}$ may be arbitrarily adjusted from positions in the initial state according to an operation by the user on the input unit 22 or the input device 112. For example, on the projection surface having concavities and convexities by a plurality of flat surfaces and a plurality of curved surfaces, the positions of at least part of the plurality of adjustment points $P_{11}$ to $P_{44}$ may be adjusted to correspond to intersections of sides of the flat surfaces or the curved surfaces.

At step S103, the input I/F 11 determines types of the lines of the respective sides by detecting input for setting of the types of the respective lines of the plurality of sides connecting the adjustment points adjacent to each other. For example, as the line types, not only linear lines by linear interpolation such as bilinear interpolation but also various curved lines by non-linear interpolation (curve interpolation) such as polynomial interpolation, spline interpolation, or cubic interpolation can be set. For example, the processing unit 25 prompts the user to set the line types by displaying a message for request to select the line types of the respective sides on the display unit 23. The line types may be selected from e.g. a list displayed on the display unit 23 via the input unit 22 or cyclically selected from predetermined options according to the operation on the respective sides.

The processing circuit 123 determines whether the respective plurality of sides are linear lines or curved lines according to the line types set via the input I/F 11. In this regard, the OSD processing circuit 121 may calculate the shapes of the respective sides and project the respective sides on the screen SC via the projection device 13 according to the line types determined in the processing circuit 123. For example, when the line type of the side $E_1$ shown in FIG. 3 is a linear line, a side $F_1$ as a linear line connecting the adjustment points $P_{22}$, $P_{23}$ may be projected. Similarly, when the line type of the side $E_2$ is a linear line, a side $F_2$ as a linear line connecting the adjustment points $P_{23}$, $P_{33}$ may be projected, and, when the line type of the side $E_4$ is a linear line, a side $F_4$ as a linear line connecting the adjustment points $P_{22}$, $P_{32}$ may be projected. When the line type of the side $E_3$ is a curved line, a side $G_3$ as a curved line connecting the adjustment points $P_{32}$, $P_{33}$ may be projected.

In the example shown in FIG. 4 etc., the side $G_3$ is described as the curved line by a thick dashed line. For example, when the shape of the side $G_3$ is determined, the processing circuit 123 selects the adjustment points in the number corresponding to the line type set at step S103 and adjacent to each other on the grid line having the side $E_3$ as a part. For example, when the line type is a quadratic curve, the processing circuit 123 selects at least the adjustment points $P_{31}$, $P_{32}$, $P_{33}$ or the adjustment points $P_{32}$, $P_{33}$, $P_{34}$. If the line type is a curved line by bicubic interpolation, it is necessary to select at least 16 adjustment points adjacent to each other. The processing circuit 123 determines the shape of the side $G_3$ by calculating a function expressing the side $G_3$ based on the positions of the selected adjustment points.

At step S104, the processing circuit 123 calculates a transformation factor in the non-linear interpolation according to the curved line determined at step S103. That is, the processing circuit 123 calculates a transformation factor $g(x,y)$ for obtaining coordinates $Dst(x,y)$ after interpolation from initial coordinates Src(x,y) before the interpolation of the image D according to the type of the curved line indicating the type of the interpolation. The processing circuit 123 calculates the transformation factor g(x,y) with respect to at least an area defined by four sides including a curved line like e.g. an area A defined by the plurality of sides $F_1$, $F_2$, $G_3$, $F_4$ including the side $G_3$ of the curved line in FIG. 4. In the embodiment, the area refers to a unit area. When a plurality of types of curved lines are determined at step S103, the transformation factor g(x,y) may be calculated with respect to each type of curved line.

At step S105, the processing circuit 123 executes non-linear interpolation processing using the transformation factor g(x,y) calculated at step S104. That is, the processing circuit 123 generates a non-linear coordinate system by non-linear interpolation according to the type of curved line determined at step S103 based on the positions of the plurality of adjustment points.

Figure 5:
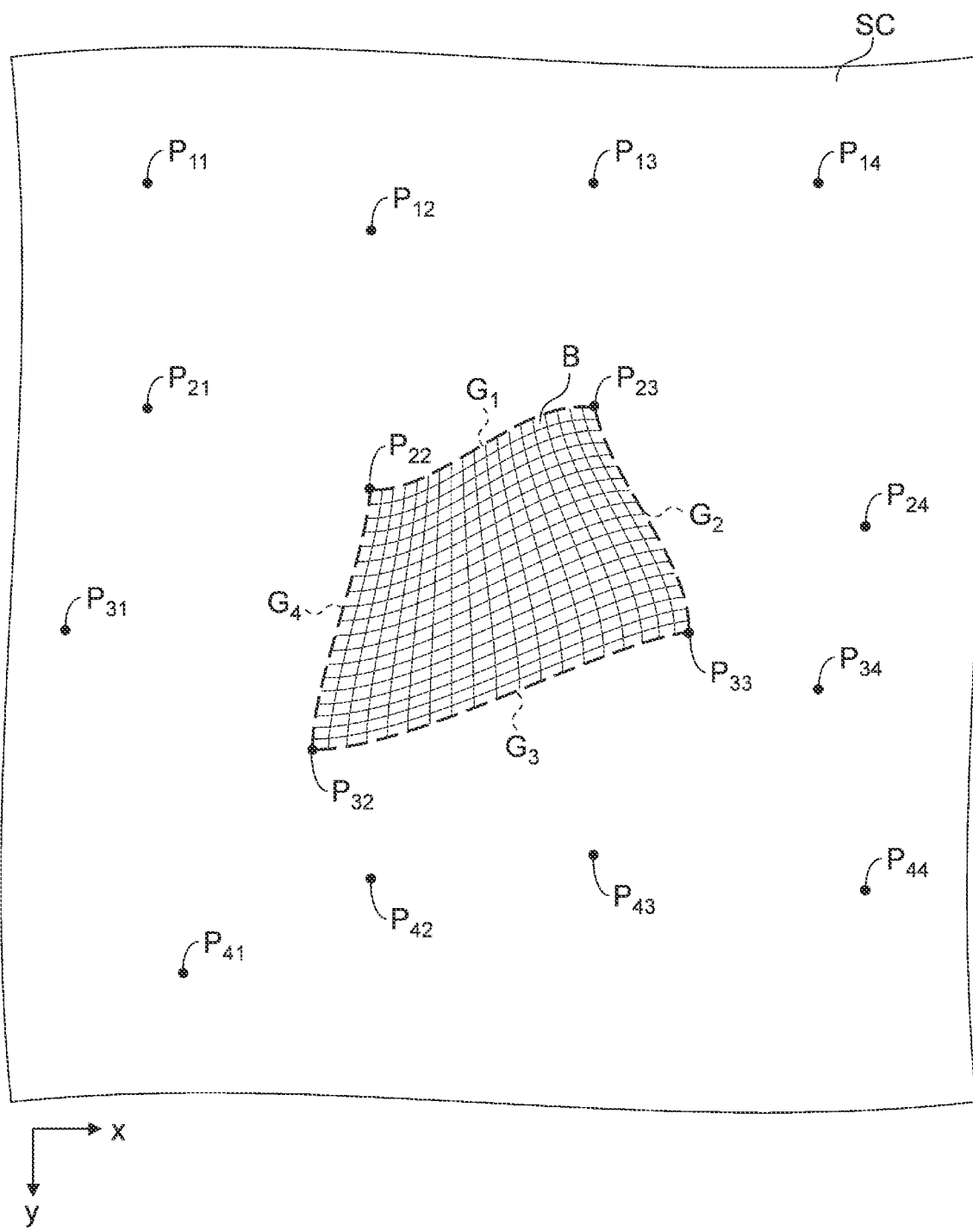
FIG. 5 is a diagram for explanation of processing of non-linear interpolation.

For example, as shown in FIG. 5, the processing circuit 123 generates non-linear coordinates by executing non-linear interpolation processing on a range corresponding to the area A of the adjustment point pattern. In the processing, the sides $F_1$, $F_2$, $F_4$ in FIG. 4 are replaced by sides $G_1$, $G_2$, $G_4$ as curved lines, respectively, according to the line type of the side $G_3$. That is, the range corresponding to the area A of the adjustment point pattern is understood as a non-linear coordinate system as a result of the non-linear interpolation like an area B defined by the respective sides $G_1$, $G_2$, $G_3$, $G_4$ as the curved lines.

At step S106, the processing circuit 123 calculates a transformation factor in linear interpolation according to the linear line determined at step S103. That is, the processing circuit 123 calculates a transformation factor f(x,y) for obtaining coordinates Dst(x,y) after interpolation from initial coordinates Src(x,y) before the interpolation of the image D according to the type of the linear line indicating the type of the interpolation. The processing circuit 123 calculates the transformation factor f(x,y) with respect to at least an area defined by four sides including a linear line like e.g. the area A defined by the plurality of sides $F_1$, $F_2$, $G_3$, $F_4$ including the sides $F_1$, $F_2$, $F_4$ of the linear lines in FIG. 4.

At step S107, the processing circuit 123 executes linear interpolation processing using the transformation factor f(x,y) calculated at step S105. That is, the processing circuit 123 generates a linear coordinate system by linear interpolation according to the types of the linear lines determined at step S103 based on the positions of the plurality of adjustment points.

Figure 6:
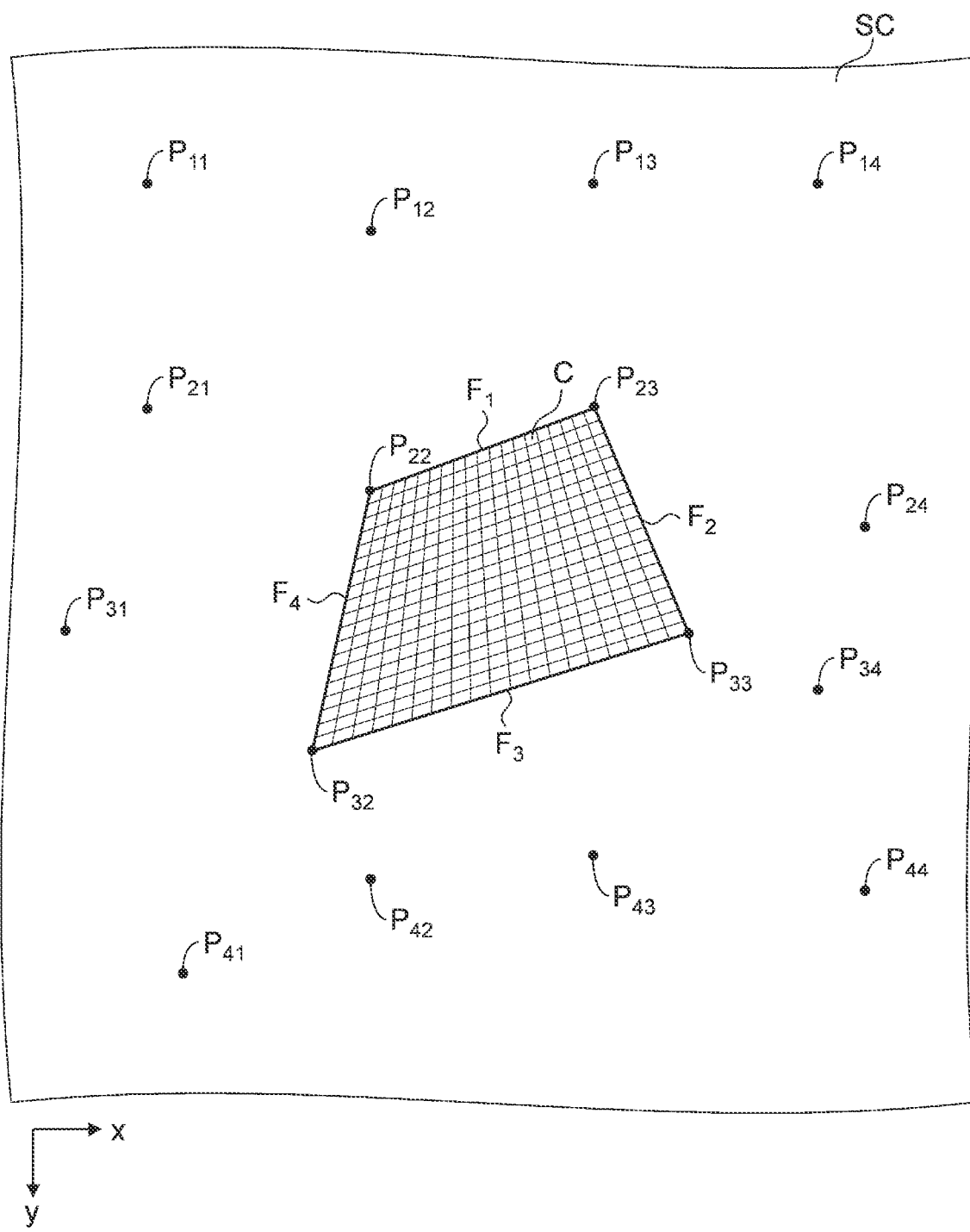
FIG. 6 is a diagram for explanation of processing of linear interpolation.

For example, as shown in FIG. 6, the processing circuit 123 generates a linear coordinate system by executing linear interpolation processing on a range corresponding to the area A of the adjustment point pattern. In the processing, the side $G_3$ in FIG. 4 is replaced by the side $F_3$ as a linear line according to the line types of the sides $F_1$, $F_2$, $F_4$. That is, the range corresponding to the area A of the adjustment point pattern is understood as a linear coordinate system as a result of the linear interpolation like an area C defined by the respective sides $F_1$, $F_2$, $F_3$, $F_4$ as the linear lines.

At step S108, the processing circuit 123 synthesizes the interpolation results at step S105 and step S107 according to the line types determined at step S103. Hereinafter, an area defined by a plurality of sides including a linear line and a curved line like the area A defined by the sides $F_1$, $F_2$, $F_4$ of the linear lines and the side $G_3$ of the curved line is referred to as a "specific area". The processing circuit 123 synthesizes the non-linear coordinate system and the linear coordinate system using weighting according to the plurality of sides defining the specific area. Thereby, the processing circuit 123 generates a coordinate system of the specific area as a result of the nonlinear interpolation and the linear interpolation.

Figure 7:
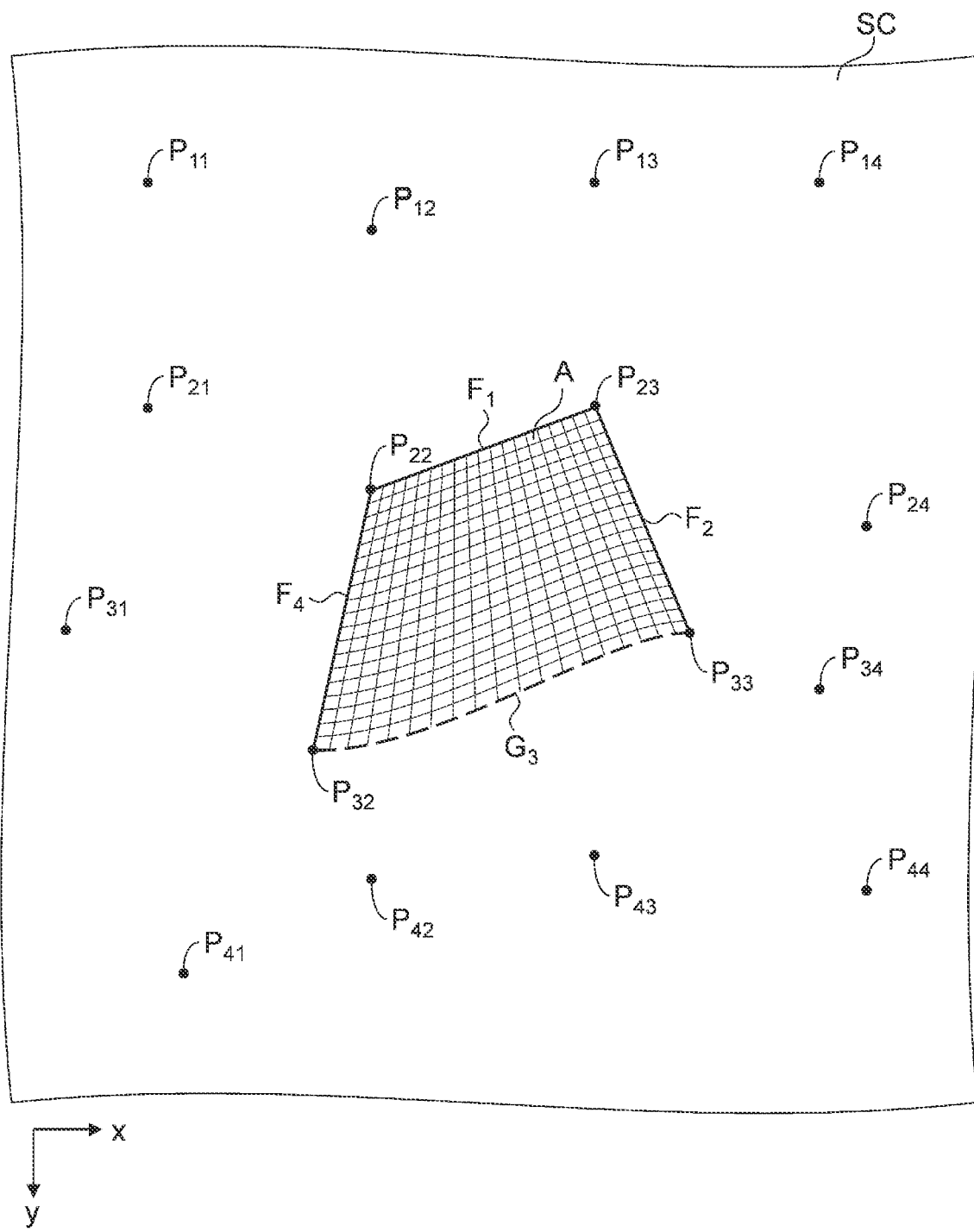
FIG. 7 is a diagram for explanation of processing of synthesizing interpolation results.

For example, as shown in FIG. 7, the processing circuit 123 generates a coordinate system of the area A defined by the sides $F_1$, $F_2$, $G_3$, $F_4$ by synthesizing the non-linear coordinate system like the area B in FIG. 5 and the linear coordinate system like the area C in FIG. 6. Specifically, the processing circuit 123 determines weighting for the non-linear coordinate system and the linear coordinate system to realize the sides $F_1$, $F_2$, $F_4$ determined as the linear lines and the side $G_3$ determined as the curved line at step S103. The gradient of the weighting is linear, for example, but may be arbitrarily determined.

At step S109, the geometric correction circuit 122 performs geometric correction of the image D using the coordinate systems respectively generated at steps S105, S107, S108. The geometric correction circuit 122 performs the geometric correction to realize the plurality of sides defining the specific area on the image D in the range corresponding to the specific area using the coordinate system of the specific area generated at step S108 as a result of the interpolation processing.

Further, the geometric correction circuit 122 maintains the result of the non-linear interpolation of the area B defined only by the sides as the curved lines of the interpolation results obtained at steps S104 to S105 and employs the result for geometric correction. That is, the geometric correction circuit 122 performs geometric correction on the image D in the range corresponding to the area B to realize the plurality of curved lines defining the area B. Similarly, the geometric correction circuit 122 maintains the result of the linear interpolation of the area C defined only by the sides as the linear lines of the interpolation results obtained at steps S106 to S107 and employs the result for geometric correction. That is, the geometric correction circuit 122 performs geometric correction on the image D in the range corresponding to the area C to realize the plurality of linear lines defining the area C.

Figure 8:
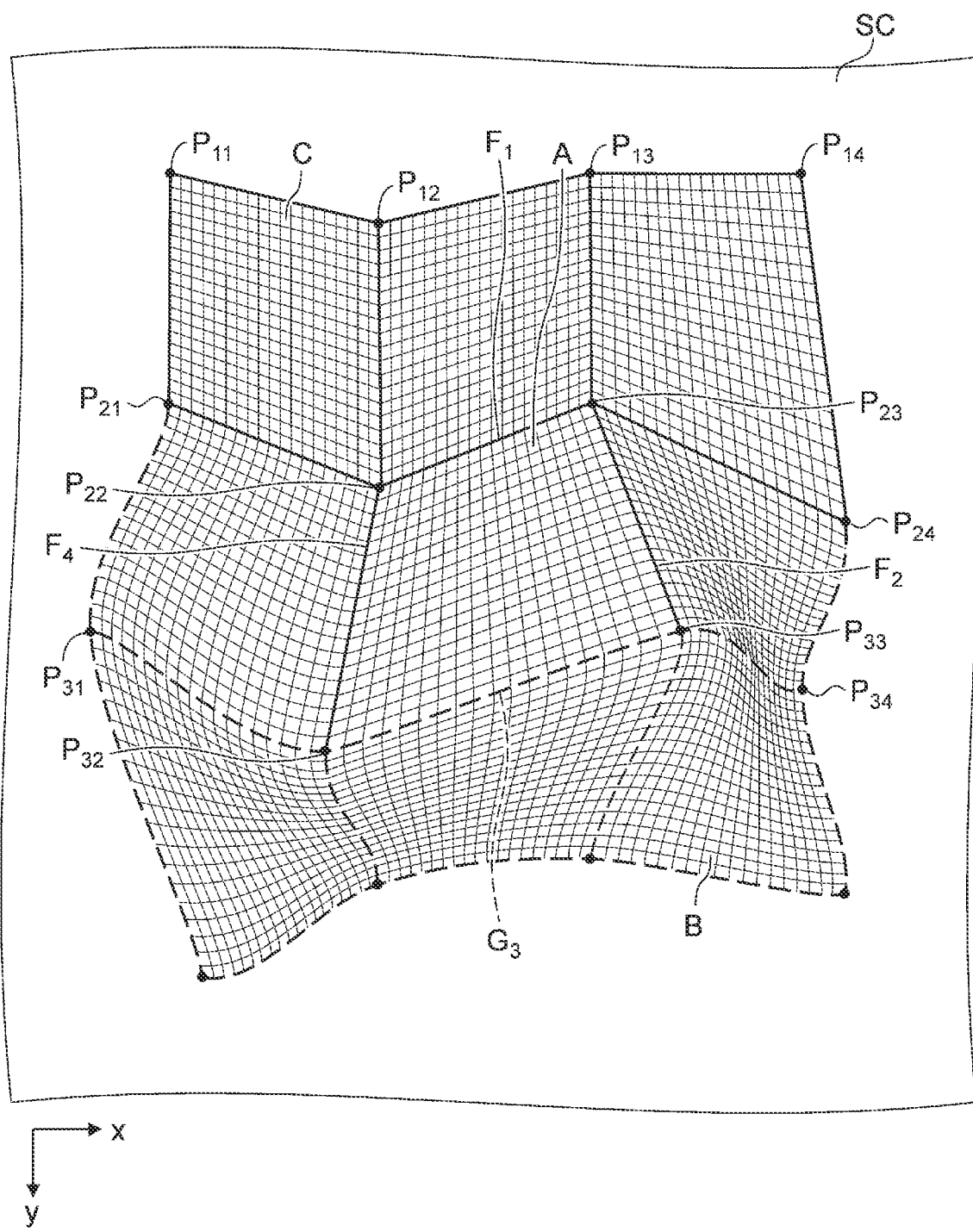
FIG. 8 is a diagram for explanation of an example of a result of entire geometric correction.

In the above described manner, as shown in FIG. 8, the geometric correction circuit 122 performs the geometric correction on the image D. In the example shown in FIG. 8, the upper three areas each correspond to the area C defined only by the sides as the linear lines. The middle three areas each correspond to the area A defined by the plurality of sides including the linear lines and the curved lines, i.e., the specific area. The lower three areas each correspond to the area B defined only the sides as the curved lines. At step S110, the projection device 13 projects the geometrically-corrected image D on the screen SC.

According to the projection system 1 of the embodiment, regarding the attributes of the sides connecting the adjustment points, whether the linear lines or the curved lines may be determined and the interpolation processing may be performed using the kinds of interpolation methods of the linear interpolation and the curve interpolation. Therefore, according to the projection system 1, appropriate geometric correction can be performed even for a projection surface having a complex shape including a plurality of flat surfaces and a plurality of curved surfaces.

Figure 2:
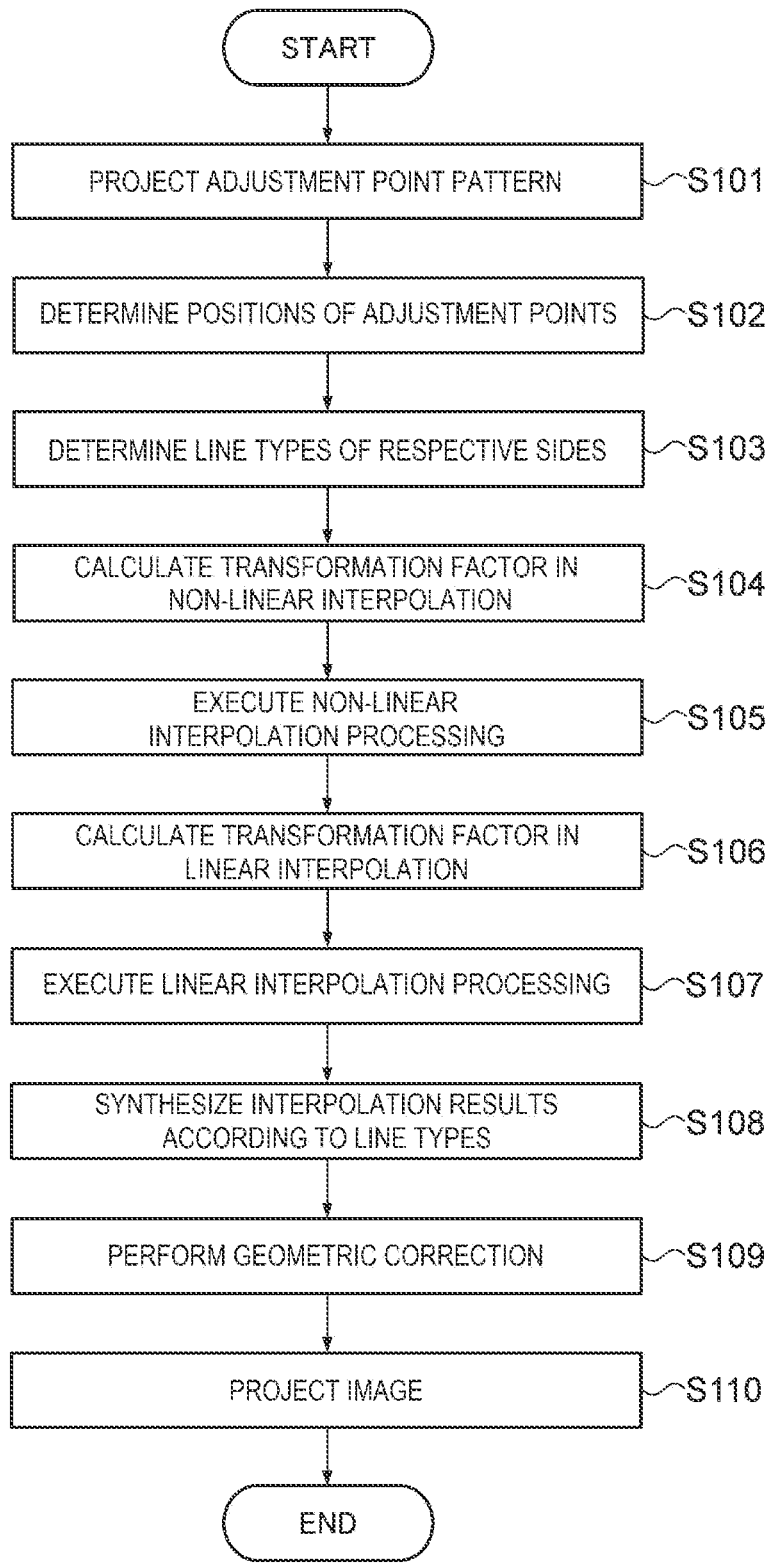
FIG. 2 is a flowchart for explanation of an example of an image projection method in the projection system.

As above, as shown in the flowchart in FIG. 2, the case using the plurality of kinds of interpolation methods of non-linear interpolation and linear interpolation at steps S104 to S108 is explained, but just an example. That is, in the projection system 1, only the non-linear interpolation may be employed and the processing load may be reduced.

Figure 9:
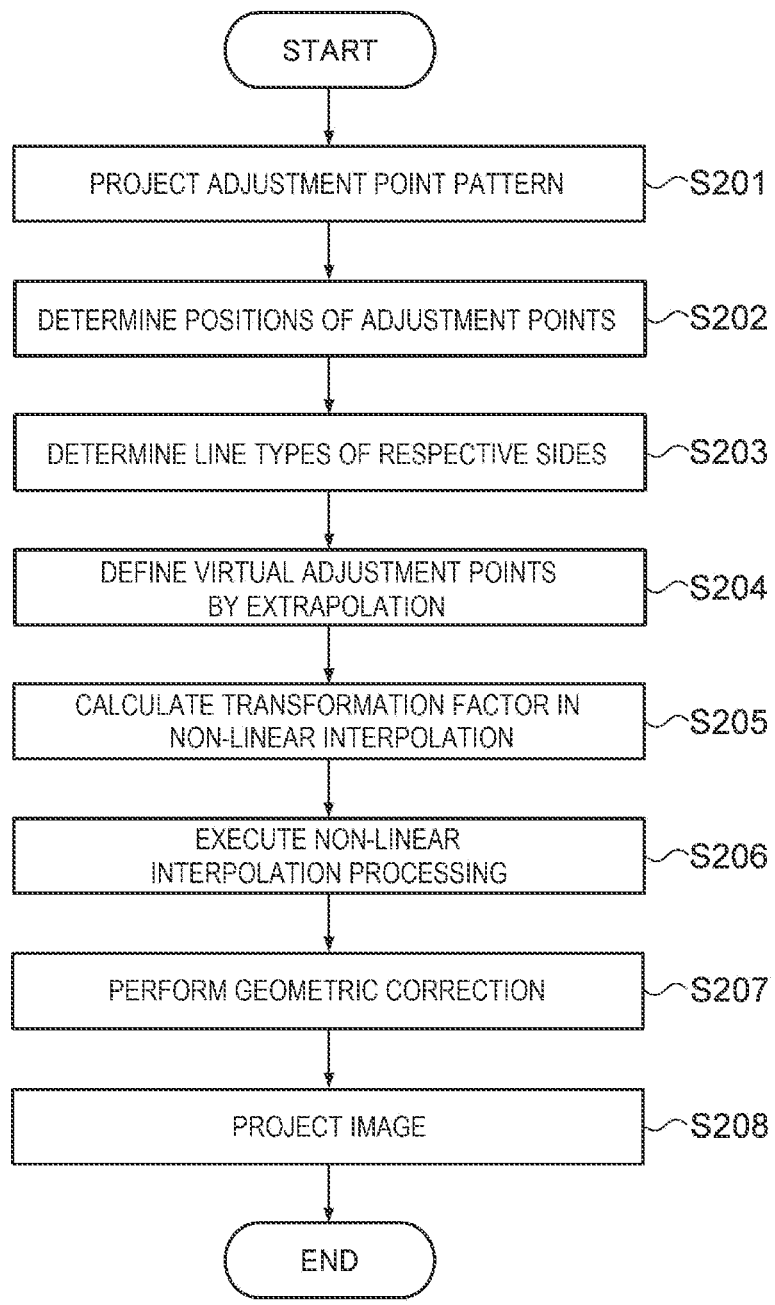
FIG. 9 is a flowchart for explanation of another example of the image projection method in the projection system.

For example, as shown in the flowchart in FIG. 9, in the projection system 1, the linear interpolation processing and the synthesis processing of the non-linear interpolation result and the linear interpolation result may be omitted. The processing at steps S201 to S203 is substantially the same as the processing at steps S101 to S103 in FIG. 2, respectively, and the overlapping explanation will be omitted.

At step S204, the processing circuit 123 defines virtual adjustment points by linear extrapolation on all linear lines determined at step S203. Particularly, the processing circuit 123 defines a virtual curve by defining the linearly extrapolated virtual adjustment points for the sides as the linear lines of the plurality of sides.

Figure 10:
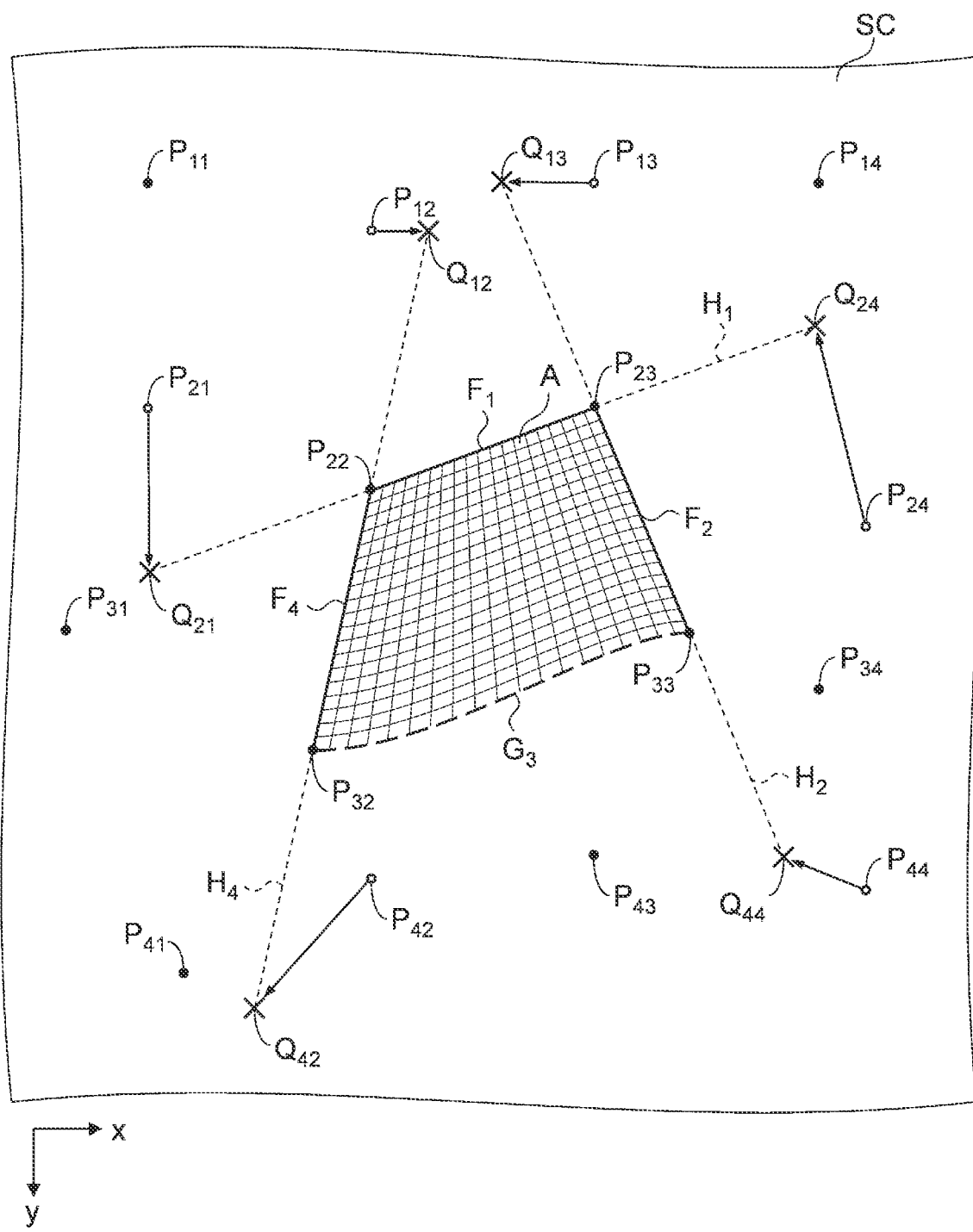
FIG. 10 is a diagram for explanation of processing in non-linear interpolation in FIG. 9.

For example, as shown in FIG. 10, the processing circuit 123 selects all sides $F_1$, $F_2$, $F_4$ as the linear lines of the plurality of sides $F_1$, $F_2$, $G_3$, $F_4$ defining the area A as the specific area. The processing circuit 123 defines virtual adjustment points $Q_{21}$, $Q_{24}$ linearly extrapolated on both sides of the side $F_1$. The processing circuit 123 defines a linear line passing through the adjustment points $P_{22}$, $P_{23}$ and the virtual adjustment points $Q_{21}$, $Q_{24}$ on both ends in the side $F_1$ as the linear line as a virtual curve $H_1$. That is, the virtual adjustment points $Q_{21}$, $Q_{24}$ are temporarily used in place of the adjustment points $P_{21}$, $P_{24}$ as reference values only in the curve interpolation with respect to the side $F_1$.

Similarly, the processing circuit 123 defines virtual adjustment points $Q_{13}$, $Q_{44}$ linearly extrapolated on both sides of the side $F_2$ as the linear line. The processing circuit 123 defines a linear line passing through the adjustment points $P_{23}$, $P_{33}$ and the virtual adjustment points $Q_{13}$, $Q_{44}$ on both ends in the side $F_2$ as a virtual curve $H_2$. The virtual adjustment points $Q_{13}$, $Q_{44}$ are temporarily used in place of the adjustment points $P_{13}$, $P_{44}$ as reference values only in the curve interpolation with respect to the side $F_2$. The processing circuit 123 defines virtual adjustment points $Q_{12}$, $Q_{42}$ linearly extrapolated on both sides of the side $F_4$ as the linear line. The processing circuit 123 defines linear line passing through the adjustment points $P_{22}$, $P_{32}$ and the virtual adjustment points $Q_{12}$, $Q_{42}$ on both ends in the side $F_4$ as a virtual curve $H_4$. The virtual adjustment points $Q_{12}$, $Q_{42}$ are temporarily used in place of the adjustment points $P_{12}$, $P_{42}$ as reference values only in the curve interpolation with respect to the side $F_4$.

At step S205, the processing circuit 123 calculates a transformation factor in the non-linear interpolation based on the curved line determined at step S203 and the virtual curve defined at step S204. That is, the processing circuit 123 calculates a transformation factor G(x,y) for obtaining coordinates Dst(x,y) after interpolation from initial coordinates Src(x,y) before the interpolation of the image D according to the type of the curved line. The processing circuit 123 calculates the transformation factor g(x,y) by handling the linear line as the virtual curve with respect to the specific area defined by four sides including a curved line and a linear line like e.g. the area A in FIG. 10.

At step S206, the processing circuit 123 executes non-linear interpolation processing using the transformation factor g(x,y) calculated at step S205. That is, the processing circuit 123 generates a non-linear coordinate system by non-linear interpolation with reference to the curved line determined at step S203 and the virtual curve defined at step S204. Particularly, the processing circuit 123 generates the non-linear coordinate system of the area A by non-linear interpolation with reference to the side $G_3$ as the curved line of the plurality of sides defining the area A and all the virtual curves $H_1$, $H_2$, $H_4$.

At step S207, the geometric correction circuit 122 performs geometric correction of the image D using the coordinate system generated at step S206. The geometric correction circuit 122 performs the geometric correction to realize the plurality of sides defining the specific area on the image D in the range corresponding to the specific area using the coordinate system of the specific area as a result of the interpolation processing. At step S208, the projection device 13 projects the geometrically-corrected image D on the screen SC.

Note that, for example, the virtual adjustment points may be determined in the following manner. In the example shown in FIG. 10, coordinates of the virtual adjustment point $Q_{21}$ are h(x0,y0), coordinates of the adjustment point $P_{22}$ are h(x1,y1), coordinates of the adjustment point $P_{23}$ are h(x2,y2), and coordinates of the virtual adjustment point $Q_{24}$ are h(x3,y3) with respect to the grid line in the horizontal direction. A difference hdx in the horizontal direction and a difference hdy in the vertical direction between the adjustment points $P_{22}$, $P_{23}$ are expressed by the following expression (1) and expression (2), respectively.

$$hdx = x2 - x1 \qquad (1)$$

$$hdy = y2 - y1 \qquad (2)$$

h(x0,y0) as the coordinates of the virtual adjustment point $Q_{21}$ and h(x3,y3) as the coordinates of the virtual adjustment point $Q_{24}$ are calculated from the following expression (3) to expression (6).

$$x0 = x1 - hdx \qquad (3)$$

$$y0 = y1 - hdy \qquad (4)$$

$$x3 = x2 + hdx \qquad (5)$$

$$y3 = y2 + hdy \qquad (6)$$

On the other hand, coordinates of the virtual adjustment point $Q_{13}$ are v(x0,y0), coordinates of the adjustment point $P_{23}$ are v(x1,y1), coordinates of the adjustment point $P_{33}$ are v(x2,y2), and coordinates of the virtual adjustment point $Q_{44}$ are v(x3,y3) with respect to the grid line in the vertical direction. A difference vdx in the horizontal direction and a difference vdy in the vertical direction of the adjustment points $P_{23}$, $P_{33}$ are expressed by the following expression (7) and expression (8), respectively.

$$vdx = x2 - x1 \qquad (7)$$

$$vdy = y2 - y1 \qquad (8)$$

v(x0,y0) as the coordinates of the virtual adjustment point $Q_{13}$ and v(x3,y3) as the coordinates of the virtual adjustment point $Q_{24}$ are calculated from the following expression (9) to expression (12).

$$x0 = x1 - vdx \qquad (9)$$

$$y0 = y1 - vdy \qquad (10)$$

$$x3 = x2 + vdx \qquad (11)$$

$$y3 = y2 + vdy \qquad (12)$$

As described above, the virtual adjustment points are calculated by simple additions and subtractions and may, be easily defined for all sides as linear lines. Therefore, according to the projection system 1 of a modified example of the embodiment, compared to the case where the two kinds of interpolation methods of the linear interpolation and the non-linear interpolation are executed as in the flowchart in FIG. 2, the processing load can be significantly reduced.

According to the projection system 1 of the modified example of the embodiment, regarding the attributes of the sides connecting the adjustment points, whether the linear lines or the curved lines may be determined and the linearly extrapolated virtual adjustment points may be selectively defined for the linear lines. Therefore, in the projection system 1, the equal results to the results of the geometric correction using the plurality of kinds of interpolation methods may be obtained by execution of curve interpolation with the linear lines as the virtual curves. That is, according to the projection system 1, appropriate geometric correction can be performed even for a projection surface having a complex shape.

Other Embodiments

The embodiments are described as above, however, the present disclosure is not limited to the embodiments. The configurations of the respective parts may be replaced by any configurations having the same functions, and any configuration may be omitted or added in the respective embodiments within the technical scope of the present disclosure. From the present disclosure, various alternative embodiments would be clear to a person skilled in the art.

For example, in the flowchart shown in FIG. 2, the non-linear interpolation processing at steps S104, S105 may be executed after the linear interpolation processing at steps S106, S107. Further, in the flowchart shown in FIG. 9, the extrapolation processing at step S204 may be executed after the calculation of the transformation factor at step S205. Specifically, the virtual adjustment points may be defined after the calculation of the transformation factor using an interpolation method in which the coordinates of the virtual adjustment points do not affect the transformation factor such as bicubic interpolation. As described above, the sequence of the processing is not limited to that described above as long as the same geometric correction results as those of the embodiments may be obtained.

In addition, obviously, the present disclosure includes various embodiments not described as above such as configurations in which arbitrary configurations described in the above described embodiments apply each other. The technical scope of the present disclosure is defined only by the matters used to specify the invention according to claims appropriate from the above described explanation.

What is claimed is:

1. An image projection method comprising:
projecting an image including a plurality of adjustment points on a screen;
determining positions of the plurality of adjustment points on the screen;
determining whether each of a plurality of sides connecting the adjustment points adjacent to each other is a linear line or a curved line;
generating a non-linear coordinate system of an area by non-linear interpolation, the area defined by the plurality of sides including the linear line and the curved line based on the plurality of sides defining the area;
generating a linear coordinate system of the area by linear interpolation;
obtaining geometrically-corrected image by performing geometric correction on the image in a range corresponding to the area; and
projecting the geometrically-corrected image on the screen,
wherein the performing the geometric correction includes performing geometric correction on the image in a range corresponding to the area by synthesizing the non-linear coordinate system and the linear coordinate system based on weighting according to the plurality of sides defining the area.

2. The image projection method according to claim 1, further comprising detecting input for setting of types of lines of the respective plurality of sides, wherein
the determining whether each of the plurality of sides connecting the adjustment points adjacent to each other is the linear line or the curved line includes determining whether each of the plurality of sides is the linear line or the curved line according to the types.

3. The image projection method according to claim 2, further comprising determining a shape of the side based on the adjustment points in a number corresponding to the type and adjacent to each other on a line having the side as a part.

4. The image projection method according to claim 1, wherein
the plurality of adjustment points are projected on the screen as a plurality of grid points in a two-dimensional grid pattern.

5. A projector comprising:
a projection device projecting an image including a plurality of adjustment points on a screen;
an input interface detecting an input by a user for adjusting positions of the plurality of adjustment points on the screen;
a processing circuit determining whether each of a plurality of sides connecting the adjustment points adjacent to each other is a linear line or a curved line, the processing circuit further configured to generate a non-linear coordinate system of an area by non-linear interpolation and a linear coordinate system of the area by linear interpolation, the area defined by the plurality of sides including the linear line and the curved line based on the plurality of sides defining the area; and
a correction circuit performing geometric correction on the image in a range corresponding to the area by synthesizing the non-linear coordinate system and the linear coordinate system based on weighting according to the plurality of sides defining the area.

6. An image projection method comprising:
projecting an image including a plurality of adjustment points on a screen;
determining positions of the plurality of adjustment points on the screen;
determining whether each of a plurality of sides connecting the adjustment points adjacent to each other is a linear line or a curved line;
defining virtual adjustment points linearly extrapolated with respect to all the linear lines of the plurality of sides defining an area, the area defined by the plurality of sides including the linear line and the curved line based on the plurality of sides defining the area;
defining a linear line passing through the adjustment points and the virtual adjustment points on both ends as a virtual curve in each of all the linear lines;
obtaining geometrically-corrected image by performing geometric correction on the image in a range corresponding to the area; and
projecting the geometrically-corrected image on the screen,
wherein performing the geometric correction includes performing geometric correction on the image in a range corresponding to the area by generating a nonlinear coordinate system of the area by non-linear interpolation with reference to all the curved lines of the plurality of sides defining the area and all the virtual curves.

\* \* \* \* \*